Oct. 4, 1938.    H. ZIEBOLZ    2,132,338
RELAY
Filed Nov. 24, 1937    2 Sheets-Sheet 1

Inventor:

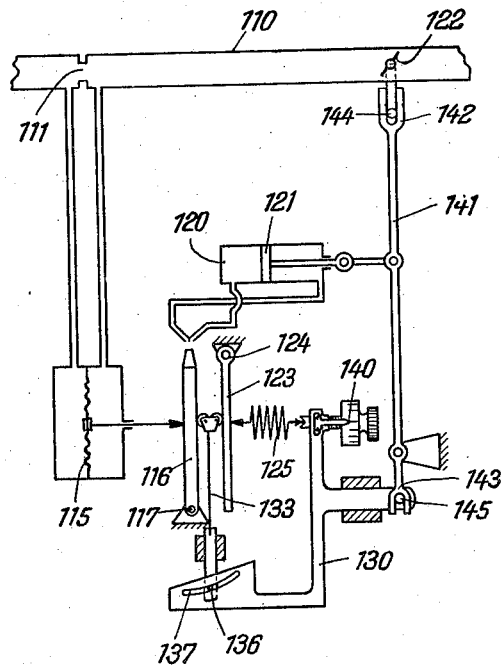
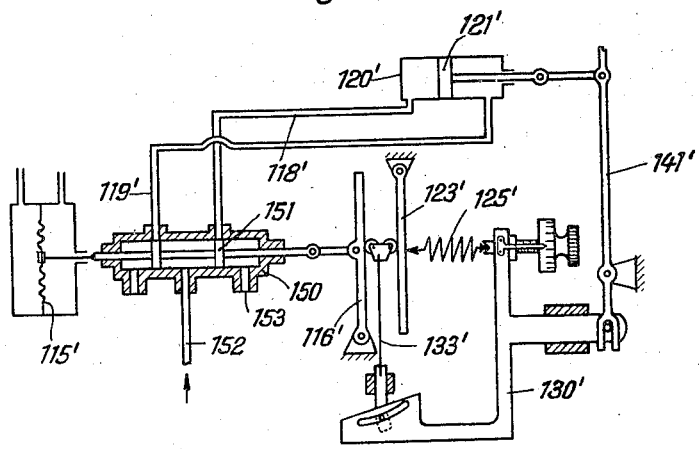

Patented Oct. 4, 1938

2,132,338

UNITED STATES PATENT OFFICE 2,132,338

RELAY

Herbert Ziebolz, Chicago, Ill., assignor to Askania-Werke A. G., a corporation of Germany Application November 24, 1937, Serial No. 176,393
In Germany November 25, 1936

8 Claims. (Cl. 121—41)

This invention relates to improvements in relays, more particularly to relays used in regulating or control devices for maintaining a condition substantially constant.

Aims, objects, and advantages of this invention will appear from a consideration of the description which follows with the accompanying drawings illustrating the principle of this invention and showing for purely illustrative purposes embodiments of this invention. It is to be understood, however, that the description is not to be taken in a limiting sense, the scope of this invention being defined in the appended claims.

Referring to the drawings:

Fig. 3 is a diagrammatic illustration of a relay used in a different form of control device.

Fig. 4 shows in part a different form of relay for use in the control device shown in Fig. 3.

For an explanation of the principle of this invention it may be assumed that a relay is used in a control device for maintaining a condition, such as a flow through a conduit, substantially constant. This purpose, for example, may be accomplished by deriving a differential pressure impulse taken at a constriction in the conduit through which the flow passes and by applying this differential pressure to a diaphragm which will accordingly exert a force which is a function of the flow. The impulse force is now applied to the movable member of a relay which is arranged to control a power medium in response to its movements for actuating condition adjusting means, such as a valve or the like. In opposition to the controlling impulse acting on the movable relay member a spring is connected to act on said member. The force of the spring determines the magnitude of the condition, in this example the magnitude of the differential pressure which is to be maintained constant by the control device. To give a more specific example it may be assumed that a controlling differential pressure diaphragm exerts a force of ten pounds, when the flow through the conduit has a predetermined magnitude which is to be maintained constant. Assuming further that the full force of the spring counter-acting the controlling impulse acts on the movable relay member it follows that the force of the spring has to be adjusted to ten pounds. When the flow through the conduit drops below the desired value the spring will move the relay member to one side, thereby causing the relay to actuate the device for adjusting the condition in a conventional manner.

As the force of the spring varies when the spring is expanded or compressed it is easily understood that the force of the spring employed in the relay will not exert a constant force, when the movable member of the relay is displaced from one extreme position to the other. It is accordingly necessary that an impulse force of a certain magnitude be exerted on the movable relay member in order to move the same into one extreme position and for actuating the condition adjusting member. When this force is small relatively to the condition magnitude the relay is said to be sensitive.

Figure 1:
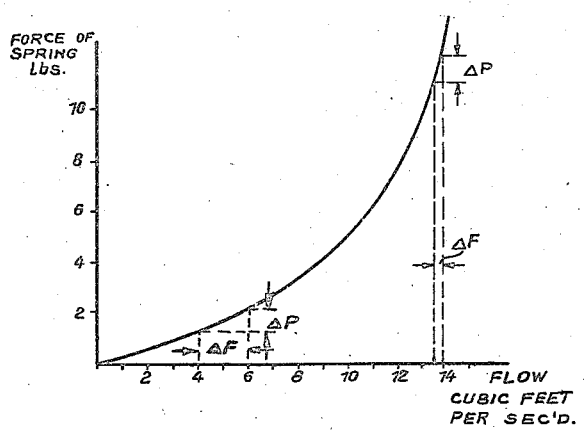
Fig. 1 is a diagram illustrating the principle of this invention.

The relative sensitivity of the conventional relay which may be expressed in terms of condition change required to operate the relay per condition magnitude is not constant throughout the range of the relay which will become clear from a consideration of Fig. 1.

It may be assumed that a relay is used for controlling a condition within a range of zero to about 15 units of condition magnitude, for example, zero to 15 cubic feet of flow per second. It may further be assumed that at one time it is desired to maintain the condition constant at a value of 6 condition units, for example, 6 cubic feet per second, while at another time the condition magnitude is to be 14. The condition magnitude is set, as hereinbefore explained, at the relay by adjusting the force of the spring counter-acting the action of the condition responsive member. In this example the condition responsive member may be a differential pressure diaphragm. Assuming further that by moving the relay into one extreme position the spring is expanded or compressed a certain amount, for example $\frac{1}{16}$ of an inch resulting in a change in the spring force of one pound, it follows that the relay will only be actuated by the differential pressure diaphragm when the force exerted by the same varies as much as one pound. The diagram of Fig. 1 shows that a change of differential pressure equal to one pound and designated as $\Delta P$ is equal in this specific example to a change in flow of 2 cubic feet per second, when the relay is adjusted to 6 cubic feet per second. In other words, the relay will only respond after the condition has changed as much as $\frac{1}{3}$ from the desired condition.

When the relay is adjusted to maintain a flow of 14 cubic feet constant, it is seen from the diagram that in order to actuate the relay by exerting on the same an impulse force of one pound the change in condition is only .5 cubic foot per second, that is 1/28 of the condition magnitude. In other words, the relay in the latter case is about ten times as sensitive as in the first.

The variation in the relative sensitivity of a relay is highly undesirable, because the relay is usually not sensitive enough, when adjusted for conditions of small magnitude, while it is too sensitive, when adjusted for conditions of great magnitude.

It is accordingly an object of this invention to provide an improved relay in which the sensitivity is matched to the condition magnitude.

Embodiments of the improved relay will now be described.

Figure 2:
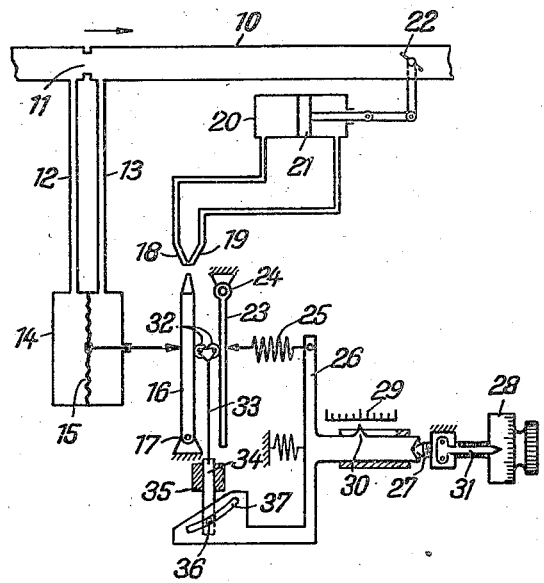
Fig. 2 is a diagrammatic illustration of a relay employed in a control device for maintaining a condition substantially constant.

In Fig. 2 a relay of the well-known Ascania jet-pipe type is shown as employed for the purpose of maintaining constant the flow through a conduit 10. A differential pressure impulse is derived from the flow at a constriction 11 in the conduit. Impulse conduits 12 and 13 lead to a diaphragm casing 14 enclosing a differential pressure diaphragm 15. The diaphragm is connected to act upon a jet-pipe 16 pivoted at 17 and supplied with pressure fluid from a source (not shown). The jet-pipe issues a jet of pressure fluid into reception orifices 18 and 19 depending upon the relative position of the jet-pipe nozzle and the orifices. The reception orifices are connected to a servo-motor including a cylinder 20 and a piston 21 movable therein and connected to actuate a condition adjusting member, in this example a valve 22 in the conduit 10. A lever 23 is pivoted about an axis 24 spaced from and substantially parallel to the pivotal axis 17 of the jet-pipe. A spring 25 bears against the lever 23, the other end of the spring being connected to a movable adjusting member 26. The member 26 is adjustable by means of a screw 27 suitably provided with a circumferential graduation 28. The position of the adjusting member 26 may further be read at a scale 29 cooperating with a pointer 30 of the adjusting member. A coarse indication is thus given at 29 and 30 and supplemented by a fine indication at 28 and 31.

A force transmitting member is arranged operatively to connect the movable relay member, in this example the jet-pipe 16, with the lever 23. In this embodiment a ratio slider is shown having rollers 32 and a flat spring 33 permitting the rollers to follow the movements of the jet-pipe. The end of the flat spring remote from the rollers is secured to a bar 34 slidable in a bearing 35 and provided with a pin 36 guided in a slot 37 of the adjusting member 26.

When the adjusting member 26 is moved to increase the tension of the spring 25 the force transmitting member is moved towards the nozzle of the jet-pipe. This movement results in increasing further the action of the spring 25 on the movable relay member, the jet-pipe 16, because in addition the lever ratio between the jet-pipe 16 and the lever 23 is varied. Furthermore a movement of the jet-pipe into one extreme position in which the jet-pipe nozzle registers with one of the orifices 18 and 19 will result in an enlarged expansion or compression of the spring 25 which, as hereinbefore explained, determines the sensitivity of the relay.

When, in turn, the relay is set to control conditions of small magnitude by decreasing the force of the spring 25, the force transmitting member is moved towards the pivoting point of the movable relay member varying the lever ratio so that the movement of the relay member causes a relatively small compression and expansion of the spring 25, thereby increasing the sensitivity of the relay.

The operation of the device shown in Fig. 2 is as follows:

When the flow through the conduit 10 decreases the differential pressure at the constriction 11 will drop causing the diaphragm 15 to permit a movement of the jet-pipe to register with the orifice 18. The jet-pipe issues a jet of pressure fluid into the respective conduit and causes the servo-motor piston 21 to move to the right, thereby moving a valve 22 towards the open position.

In the embodiment shown in Fig. 3 a differential pressure is derived at a constriction 111 of a conduit 110 and connected to act on a differential pressure diaphragm 115. The diaphragm acts on a movable relay member, a jet-pipe 116 pivoted at 117 and controlling the position of a piston 121 relatively to a servo-motor cylinder 120. A lever 123 is pivoted at 124 and acted upon by a spring 125 adjustable relatively to a movable member 130 by means of an adjusting screw 140. The movable member 130 is further provided with a slot 137 in which a pin 136 of a force transmitting member 133 is guided. A servo-motor piston 121 is connected to a double-armed lever 141 having forked ends 142 and 143 engaging pins 144 of a valve 122 and 125 of the movable member 130, respectively.

The relay of Fig. 3 is set for a predetermined condition magnitude by adjusting the spring relatively to the movable member 130. When the flow through the conduit drops below the predetermined value, the force exerted by the diaphragm is decreased permitting the jet-pipe to move to the left under the action of the spring 125 and causing the servo-motor piston 121 to move to the left. The double-armed lever 141 will accordingly be turned counter-clockwisely moving the valve towards the open position. At the same time the movable member 130 is moved towards the right decreasing the tension of the spring, thereby preventing an "overshooting" or "hunting" of the control device. The action of the spring on the movable relay member is further, assisted by the force transmitting member 50 moving downwardly and varying the ratio of transmission between the spring and the jet-pipe.

In Fig. 4 a modified form of relay is shown for use in connection with the control device of Fig. 3. A differential pressure diaphragm 115' actuates a control valve including a casing 150 and a valve member 151. Fluid under pressure is supplied to the control valve through a conduit 152 whence it is permitted to flow to the servo-motor 120', 121' through conduits 118', 119' depending upon the relative position of the valve member 151 and casing 150. When the valve member is moved towards the left fluid will enter the conduit 119' to move the servo-motor piston to the left. The piston causes a movement of the double armed lever 141' in counter-clockwise direction. Fluid returning from the servo-motor passes through the conduit 118' to escape through a port 153. The counter-clockwise movement of the double armed lever 141' causes the movable member 130' to be displaced to the right decreasing the tension of the spring 125' and moving the force transmitting member 133' downwardly. The force transmitting member engages the lever 123' and a second lever 116' connected to the control valve member 151.

Obviously this invention is not restricted to the particular embodiments herein shown and described. Moreover it is not indispensable that all the features of this invention be used conjointly, since they may be advantageously employed in various combinations and sub-combinations.

What is claimed is:

1. In a relay the combination of a movable relay member; a lever; a spring acting on said lever; a force transmitting member mounted for displacement relatively to, and engaging said relay member and lever; and means for jointly varying the tension of said spring and displacing said transmitting member.

2. In a relay two levers pivoted about axes spaced from and substantially parallel to each other; a spring acting on one of said levers; a force transmitting member mounted for displacement relatively to, and engaging said levers; and means for jointly varying the tension of said spring and displacing said transmitting member.

3. In a relay a first lever pivoted about an axis and arranged to control a flow of power medium in response to its movement about said axis; a second lever pivoted about an axis spaced from and substantially parallel to the pivotal axis of said first lever; relay controlling means acting on one of said levers; a spring acting on the other lever; a force transmitting member mounted for displacement relatively to, and engaging said levers; and means for jointly varying the tension of said spring and displacing said transmitting member.

4. In a relay a first lever pivoted about an axis and arranged to control a flow of power medium in response of its movement about said axis; a second lever pivoted about an axis spaced from and substantially parallel to the pivotal axis of said first lever; relay controlling means acting on one of said levers; a spring acting on the other lever; a force transmitting member mounted for displacement relatively to, and engaging said levers; a servo-motor connected to be actuated by the relay power medium; and means connected to be operated by said servo-motor for jointly varying the tension of said spring and displacing said transmitting member.

5. In a relay a first lever pivoted about an axis and arranged to control a flow of power medium in response of its movement about said axis; a second lever pivoted about an axis spaced from and substantially parallel to the pivotal axis of said first lever; relay controlling means acting on one of said levers; a spring acting on the other lever; a force transmitting member mounted for displacement relatively to, and engaging said levers; a servo-motor connected to be actuated by the relay power medium; and means connected to be operated by said servo-motor for displacing said transmitting member.

6. In a jet-pipe relay a jet-pipe pivoted about an axis; a lever pivoted about an axis spaced from and substantially parallel to the pivotal axis of said jet-pipe; relay controlling means acting on said jet-pipe; a spring acting on said lever; a force transmitting member mounted for displacement relatively to, and engaging said jet-pipe and lever; and means for jointly varying the tension of said spring and displacing said transmitting member.

7. In a jet-pipe relay a jet-pipe pivoted about an axis and adapted to discharge a jet of pressure fluid; a lever pivoted about an axis spaced from and substantially parallel to the pivotal axis of said jet-pipe; relay controlling means acting on said jet-pipe; a spring acting on said lever; a force transmitting member mounted for displacement relatively to, and engaging said jet-pipe and lever; a servo-motor connected to be actuated by pressure fluid issued from said jet-pipe; and means connected to be operated by said servo-motor for jointly varying the tension of said spring and displacing said transmitting member.

8. In a jet-pipe relay a jet-pipe pivoted about an axis and adapted to discharge a jet of pressure fluid; a lever pivoted about an axis spaced from and substantially parallel to the pivotal axis of said jet-pipe; relay controlling means acting on said jet-pipe; a spring acting on said lever; a force transmitting member mounted for displacement relatively to, and engaging said jet-pipe and lever; a servo-motor connected to be actuated by pressure fluid issued from said jet-pipe; and means connected to be operated by said servo-motor for displacing said transmitting member.

HERBERT ZIEBOLZ.